United States Patent [19]

Von Kutepow

[11] 3,876,695

[45] Apr. 8, 1975

[54] PRODUCTION OF ADIPIC ACID

[75] Inventor: Nikolaus Von Kutepow, Karlsruhe-Rueppurr, Germany

[73] Assignee: Badische Anilin- & Soda- Fabrik Aktiengesellschaft, Ludwigshafen/Rhein, Germany

[22] Filed: July 23, 1971

[21] Appl. No.: 165,722

[30] Foreign Application Priority Data
July 30, 1970 Germany............................ 2037782

[52] U.S. Cl............................................ 260/533 A
[51] Int. Cl......................... C07c 55/14; C07c 51/14
[58] Field of Search............................. 260/533 AN

[56] References Cited
UNITED STATES PATENTS
3,168,553   2/1965   Slaugh ...................... 260/533 A X
3,509,209   4/1970   Fenton............................ 260/533 A
3,579,552   5/1971   Craddock et al. ........... 260/533 A X
3,637,833   1/1972   Fenton........................ 260/533 A

*Primary Examiner*—Lorraine A. Weinberger
*Assistant Examiner*—Richard D. Kelly
*Attorney, Agent, or Firm*—Johnston, Keil, Thompson & Shurtleff

[57]  ABSTRACT

Production of adipic acid by reaction of butadiene, carbon monoxide and water at elevated temperature and pressure and in the presence of a rhodium catalyst and free or combined halogen. Adipic acid is suitable for the production of nylon-6.6 salt.

5 Claims, No Drawings

PRODUCTION OF ADIPIC ACID

Prior attempts to react butadiene with carbon monoxide and water in the presence of nickel compounds as catalysts or in the presence of nickel carbonyl as catalyst and carbon monoxide donor to form adipic acid have not achieved the desired results. The main products obtained are monocarboxylic acids, for example valeric acid, and other by-products of butadiene, for example polybutadiene and 1-vinylcyclohexene-3. Carbonylation of 1-vinylcyclohexene-3 produces the corresponding mono- and dicarboxylic acids (see for example "Liebigs Annalen der Chemie", Vol. 582 (1953) pp. 56–57).

In another known process, the reaction of butadiene, carbon monoxide and alcohol in the presence of palladium complexes as catalysts and with the addition of hydrogen chloride at mild reaction temperatures (70° to 100°C) produces exclusively 3-pentenoic esters (see "Angewandte Chemie", Vol. 80 (1968) pp. 352–359).

French Patent No. 1,520,323 describes a catalytic process comprising the carbonylation of butadiene in the presence of a catalyst system consisting of dicobalt octacarbonyl and pyridine to give a mixture of adipic acid, α-methylglutaric acid, ethylsuccinic acid and valeric acid. The total yield with reference to butadiene is from 50 to 70 percent. Although the said patent states that adipic acid may be isolated from the product, no yields are revealed. "Journal of Organic Chemistry" (Russian) Vol. 2 (1966) pp. 231–235, discloses yields obtained by paper chromatography following the same reaction. According to this citation adipic acid may be obtained in a yield of 22 percent on butadiene. A later paper in "Journal of Applied Chemistry" (Russion) Vol. 34 (1966) pp. 2811–2814, however, states yields of only 0.7 percent. In experiments carried out according to the instructions given in said citation, we have found that only traces of adipic acid can be detected.

In the said article in the Journal of Applied Chemistry (Russian) Vol. 34 (1966) pp. 2811–2814 the catalytic action of rhodium carbonyl and iridium carbonyl in the presence of pyridine in the reaction of butadiene with carbon monoxide and water is examined. It is shown that when rhodium carbonyl is used as catalyst the yield of pentenoic acid on butadiene is between 3 and 5 percent and the total yield of dicarboxylic acids based on butadiene is between 0.5 and 0.6 percent of theory.

It is an object of the invention to provide a process which produces adipic acid from butadiene in reasonable yields. It is another object of this invention to provide a process in which butadiene is converted to adipic acid in a pure form. These and other objects and advantages of the invention will be better understood from the following detailed description.

It has now been found that the catalytic reaction of butadiene with carbon monoxide and water at elevated temperature and pressure and in the presence of a solvent produces better yields of adipic acid when the catalysts are rhodium salts and free or combined halogen is used as activator.

The process has the advantage that the adipic acid is obtained in a pure form so that it need be recrystallized only once in order to obtain an adipic acid having the melting point published in the literature. The only by-product obtained in an appreciable amount is valeric acid, whilst polymers of butadiene and other by-products, including other dicarboxylic acids, occur in negligible amounts.

The reaction may be illustrated by the following equation:

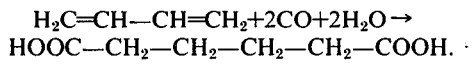

Butadiene and carbon monoxide are used in the commercially available grades. Water is used in the stoichiometric amount based on butadiene. Deviations from the stoichiometric amount of, say, up to +20 percent do not impair the reaction. With reference to the ratio of butadiene to carbon monoxide it may be stated that it is simplest to apply carbon monoxide pressure until the uptake of carbon monoxide ceases. It is possible, of course, to use a specific amount of carbon monoxide, for example the stoichiometric amount based on butadiene or any desired excess over the said stoichiometric amount. The reaction is generally carried out at a temperature of from 90° to 250°C and preferably from 110° to 220°C. Superatmospheric pressure is used, for example from 20 to 300 atm. and preferably from 50 to 200 atm.

The catalyst used is a rhodium compound. Particularly suitable compounds are salts such as the chloride, bromide or nitrate and particularly suitable compounds are rhodium carbonyl complexes such as may be represented by the following formulae for example:

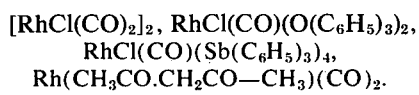

In general, the rhodium is used in concentrations of from 0.001 to 0.1 percent of rhodium metal based on the reaction mixture. A higher rhodium concentration is not detrimental but will usually not be employed due to the high cost of rhodium.

The activator used is free or combined halogen, in particular chlorine, bromine and iodine, the latter being preferred. The halogens may be used in the form of inorganic, organic or complex compounds. Alternatively, free halogens such as free chlorine, bromine or iodine, may be used. Examples of halogen compounds which may be used are hydrogen chloride, hydrogen bromide, hydrogen iodide, alkali chlorides, bromides and iodides, alkaline earth metal chlorides, bromides and iodides, zinc chloride, zinc bromide, zinc iodide, cadmium chloride, cadmium bromide, cadmium iodide, aluminum chloride, aluminum bromide, copper chlorides, copper bromides, bismuth chloride and bismuth bromide. Organic halides, for example lower alkyl halides such as methyl chloride, methyl bromide and in particular methyl iodide, may also be used. It is advantageous to use compounds containing both rhodium and halogen, i.e. rhodium halides and complexes containing both rhodium and halogen such as $[RhCl(CO)_2]_2$. The concentration of elementary or combined halogen is in general between 0.1 and 3.5 percent and preferably between 1.0 and 2.0 percent by weight, based on the reaction mixture.

The reaction is carried out in the presence of a solvent or diluent. The ratio of solvent or diluent to butadiene is generally in the range 100:6 to 100:30 and in particular 100:10 to 100:30. It is advantageous to use a solvent which is a non-solvent for adipic acid but is a good solvent for valeric acid. Suitable solvents are aromatic hydrocarbons such as benzene, toluene, the xylenes, cumene, saturated cycloaliphatic hydrocarbons, in particular cyclopentane, cyclohexane, cyclo-octane and dimethyl cyclohexane, and saturated aliphatic hydrocarbons, preferably those having from 8 to 12 carbon atoms. The boiling point or boiling range of the preferred hydrocarbons is within the limits 50° and 220°C. Thus petrols and petroleum fractions are also suitable. The use of toluene has been found to be particularly successful.

The process may be carried out batchwise or continuously. Since the reaction mixture has a corrosive action, it is advisable to use pressure vessels lined with a nickel/chromium/molybdenum alloy, such as that available under the trade name "Hastelloy" C (Hastelloy is a registered trade mark). Such alloys usually have compositions ranging from 40 to 70 percent of nickel, 10 to 30 percent of chromium and 10 to 40 percent of molybdenum. It is advisable to agitate the reaction mixture in the pressure vessel during the reaction, either by rotation or shaking, in the case of batchwise autoclave processes, or by the use of appropriate baffles in the case of continuous operations. When the process is carried out continuously, the feed may consist, for example, of butadiene and solvent and a solution of the catalyst in water, whilst carbon monoxide is introduced under pressure. In continuous operation the gas and liquid streams may flow in the same or opposite directions. Since carbon monoxide will usually be used in excess, it is conveniently separated after the reaction and re-used.

In continuous operation, the catalyst may be dissolved or suspended in the reaction mixture and the carbon monoxide caused to flow upwardly through the reaction mixture, or alternatively the reactants may be caused to trickle down through a fixed bed consisting of supported catalyst.

The process of the invention produces adipic acid in a high state of purity. It may be further purified by recrystallization from usual solvents such as methyl acetate. It is usual to obtain, after only one recrystallization, a melting point of from 151° to 152°C.

EXAMPLE 1

To a shaker autoclave provided with a corrosion-resistant lining of a nickel/chromium/molybdenum alloy such as that available under the trade name Hastelloy C and having a capacity of 0.25 liter there are charged about 90 g of a solution of 10 ml (6 g) of butadiene in 100 ml (85 g) of toluene and 5 g of water, 3.5 g of methyl iodide and 0.15 g of $Rh(CO)_2Cl_2$. The autoclave is sealed and its internal pressure is raised to 100 atm. of carbon monoxide, whereupon it is heated to 220°C over 4 hours. When this temperature has been reached, the pressure is raised to 300 atm. of carbon monoxide. This pressure is maintained by carbon monoxide feed until no further pressure drop occurs. The reaction is complete after about 1 hour. The autoclave is then cooled and vented. The resulting reaction mixture is filtered. The filter cake consists of 4.6 g of crude adipic acid, which is recrystallized from 15 ml of ethyl acetate to give 4.2 g of pure adipic acid melting at 152°C. This is equivalent to a yield on butadiene of 26 percent of theory.

EXAMPLE 2

About 275 g of a solution of 30 ml of butadiene (18 g) in 255 g of toluene, and 15 g of water, 11.2 g of methyl iodide and 0.3 g of $Rh(CO)_2Cl$ are reacted in the manner described in Example 1 in a rotary autoclave having a capacity of 0.8 l. After a heating-up period of 4 hours and a reaction time of approximately 1 hour there are obtained 12.1 g of crude adipic acid giving 11.2 g of pure adipic acid, m.p. 151°–153°C after recrystallization. This is equivalent to a yield on butadiene of 23 percent of theory.

EXAMPLE 3

A charge of 86 g of toluene, 6 g of butadiene, 7.5 g of water, 3.5 g of methyl iodide and 0.1 g of $RhCl_3 \cdot 3H_2O$, contained in a shaker autoclave having a capacity of 0.25 l, is treated in the manner described in Example 1 by slow heating to 220°C over 4 hours under a carbon monoxide pressure of 75 atm. followed by holding at this temperature for a further 2 hours. The autoclave is cooled and vented and the reaction mixture is suction filtered. There are obtained 6.5 g of adipic acid, which is recrystallized from 100 g of ethyl acetate to give 5.9 g of adipic acid, m.p. 150°–151°C. The filtrate obtained from the reaction mixture is worked up by distillation. Toluene initially distils off at atmospheric pressure and valeric acid is distilled at a pressure of 20 mm of Hg, 5.5 g of valeric acid being obtained. The residue (6.0 g) is esterified with methanol and analyzed by gas chromatography. It is found to contain 4 g of α-methylglutaric acid and 2 g of adipic acid.

Thus the total yield of adipic acid is 7.9 g, equivalent to 49.3 percent of theory based on butadiene. The yield of adipic acid and α-methylglutaric acid together is 11.9 g, equivalent to 74 percent of theory based on butadiene.

EXAMPLE 4

To a shaker autoclave provided with a corrosion-resistant lining of a nickel/chromium/molybdenum alloy available under the trade name Hastelloy C and having a capacity of 250 ml there are charged about 90 g of a solution of 10 ml (6g) of butadiene in 100 ml of toluene, and 5 g of water, 3.5 g of methyl iodide and 0.1 g of $RhCl_3 \cdot 3H_2O$. The autoclave is sealed and its internal pressure raised to 75 atm. of carbon monoxide, whereupon it is heated to 220°C over 4 hours. After one further hour, the pressure has dropped to 50 atm. gage and the absorption of carbon monoxide has ceased. After cooling and venting of the autoclave, there are obtained 7.1 g of crude adipic acid giving 6.2 g of pure adipic acid, m.p. 150°–151°C, after recrystallization from ethyl acetate. This corresponds to a yield of 37.7 percent of theory based on butadiene.

I claim:

1. A process for the production of adipic acid which comprises reacting butadiene, carbon monoxide and water at a temperature of about 90° to 250°C. and at a pressure of about 20 to 300 atmospheres, said reaction being carried out in a reaction mixture consisting essentially of the reactants in an inert aromatic hydrocarbon solvent, a catalyst selected from the group consisting of rhodium salts and rhodium halide carbonyl complexes and methyl iodide as an activator.

2. A process as claimed in claim 1 wherein said solvent is toluene.

3. A process as claimed in claim 1 wherein the ratio of solvent to butadiene is about 100:6 to 100:30.

4. A process as claimed in claim 1 wherein the catalyst is rhodium carbonyl chloride.

5. A process as claimed in claim 1 wherein the catalyst is rhodium chloride.

* * * * *